US007350773B2

(12) United States Patent
French et al.

(10) Patent No.: US 7,350,773 B2
(45) Date of Patent: Apr. 1, 2008

(54) VORTEX HUMIDIFIER

(75) Inventors: Jon French, Uxbridge, MA (US);
Johnson Hsu, Framingham, MA (US)

(73) Assignee: Sunbeam Products, Inc., Boca Raton, FL (US)

( * ) Notice: Subject to any disclaimer, the term of this patent is extended or adjusted under 35 U.S.C. 154(b) by 92 days.

(21) Appl. No.: 11/445,827

(22) Filed: Jun. 1, 2006

(65) Prior Publication Data

US 2007/0278702 A1   Dec. 6, 2007

(51) Int. Cl.
*B01F 3/04* (2006.01)
(52) U.S. Cl. .................. 261/79.2; 261/81; 362/96; 362/101
(58) Field of Classification Search .................. 261/28, 261/30, 72.1, 79.2, 81, DIG. 48, DIG. 65; 362/96, 101, 154, 253, 318
See application file for complete search history.

(56) References Cited

U.S. PATENT DOCUMENTS

| 3,881,895 | A | * | 5/1975 | Wattles .................. 95/219 |
| 4,241,877 | A | * | 12/1980 | Hughes .................. 239/405 |
| 4,258,912 | A | * | 3/1981 | Reighart, II .................. 472/65 |
| 5,322,646 | A |   | 6/1994 | Wright et al. |
| 5,792,390 | A |   | 8/1998 | Marino |
| 6,053,482 | A |   | 4/2000 | Glenn et al. |
| 6,275,652 | B1 |   | 8/2001 | Chauviaux |
| 6,301,433 | B1 | * | 10/2001 | Montagnino et al. ....... 392/405 |
| 6,335,517 | B1 |   | 1/2002 | Chauviaux et al. |
| 6,676,271 | B2 | * | 1/2004 | Kohn et al. .................. 362/101 |
| 6,883,724 | B2 |   | 4/2005 | Adiga et al. |
| 2005/0035472 | A1 | * | 2/2005 | Schur .................. 261/79.2 |
| 2005/0248044 | A1 |   | 11/2005 | Kim et al. |
| 2006/0138685 | A1 | * | 6/2006 | Gordon et al. ............. 261/79.2 |
| 2006/0163754 | A1 | * | 7/2006 | Barthelson et al. ........... 261/30 |
| 2007/0035044 | A1 | * | 2/2007 | Chiu .................. 261/81 |

\* cited by examiner

*Primary Examiner*—Scott Bushey
(74) *Attorney, Agent, or Firm*—Hoffmann & Baron, LLP

(57) ABSTRACT

A humidifier which creates a visually entertaining helical flow of mist generally includes a base unit defining a reservoir for holding a quantity of water, a water tank supported on the base unit for supplying water to the reservoir, a humidification device, such as an ultrasonic transducer, in communication with the reservoir for vaporizing the water held in the reservoir to produce a mist, a vortex unit supported on the base unit and a nozzle and a vortex creator positioned in the vortex unit. The vortex unit has an opening disposed above the base unit reservoir to permit the mist produced by the humidification device to rise upwardly into the vortex unit. The nozzle is positioned adjacent the mist opening for introducing a carrier medium flow into the vortex unit and the vortex creator is positioned above the nozzle and the mist opening for diverting the upwardly rising mist from the reservoir into the carrier medium flow from the nozzle and directing a combined mist and carrier medium flow into a helical path within the vortex unit.

18 Claims, 9 Drawing Sheets

VORTEX HUMIDIFIER

BACKGROUND OF THE INVENTION

1. Field of the Invention

The present invention relates to a humidifier having a controlled airflow pattern. More particularly, the present invention relates to a humidifier having a means to cause the produced vapor/mist to swirl in a vortex as it exits the humidifier.

2. Description of the Prior Art

Humidifiers are useful in raising the humidity of air inside homes, particularly during periods of dry weather during the winter and when heat inside a home causes the relative humidity within the home to be lowered to an uncomfortable level. Under these conditions, it is desirable to introduce moisture into the air. Such increased humidity may be desirable in order to improve the comfort level for individuals experiencing the humidified air. For example, during cold weather indoor humidity levels can drop causing drying of skin or throat and adding to the discomfort of respiratory infections.

In general, humidifiers vaporize water and expel the vapor into the surrounding environment in order to increase the moisture content thereof. Humidifiers are available in a variety of sizes and designs and include both console units and portable units. Console units typically are large stationary units having the humidifying capacity to affect large areas such as an entire house. Portable units are smaller in size and usually have the humidifying capacity to meet the requirements of a single room. Portable humidifiers due to their small size permit them to be moved from room to room as required.

Several types of humidifiers for increasing humidity in a room are well known in the art, and include ultrasonic, steam-type, warm-air and evaporative humidifiers. In each case, such humidifiers typically include a housing having an inlet, an outlet, a reservoir for holding water and a fan that is connected to the housing for creating an airflow. Water is supplied to the reservoir by a supply tank which is removably supported in the housing. The tank may be removed as required in order to replenish the water supply. Water is typically introduced into the tank through a fill hole which is covered by a removable cap.

Water is typically transferred from the tank to the base reservoir through a valve assembly disposed in the bottom of the tank. When the tank is placed in the base, the valve engages a member on the base which urges the valve into an open position thereby allowing the water to flow into the reservoir. As water flows from the tank to the reservoir, air simultaneously is drawn into the tank through the valve by the vacuum created from the exiting water. When the water level in the reservoir rises to such a degree that the valve opening becomes covered with water, a hydrostatic balance is reached and the flow of water ceases. As water is vaporized, the reservoir level drops disturbing the balance and resulting in the continued flow of water from the tank. This controlled flow cycle ensures that the humidification device will have a supply of water with which to vaporize, as well as limiting the amount of water such that no water spills over the edges of the base reservoir.

Ultrasonic or nebulizing humidifiers typically atomize the water by way of an ultrasonic transducer. The transducer converts water in the reservoir to a fine mist by using an ultrasonic wave produced with a vibrating plate or nebulizer contained therein. The resulting fine mist is then typically directed out of the humidifier with a fan to raise the moisture content in the surrounding area.

Steam-type humidifiers, on the other hand, often utilize an induction heating process, which involves the heating of a metal target or work piece by an induced current. Generally, water is provided in a reservoir together with a metal target. An inductor coil adjacent the target is supplied with power causing the target to heat the water sufficiently to produce steam. The steam is directed out of the humidifier into the environment to thereby increase the humidity of the environment.

In evaporative humidifiers, a water absorbing material, generally known as a wick, is seated partially submerged in the water of the reservoir and is adapted to draw water in the upper non-immersed part by capillary action. An airflow created by a fan is directed to pass through the upper non-immersed portion of the wick to humidify the air in the room.

Generally, the primary goal of all types of conventional humidifiers is to provide moisture to the environment with little attention being paid to the manner in which the moisture laden vapor/mist is visually presented. However, in U.S. Pat. No. 5,322,646, a visually entertaining humidifier has been proposed which generates and displays a small scale tornado-like air flow with the vapor/mist produced by the humidifier. This is accomplished with two air distribution tubes mounted within a chamber which provide an airflow to urge a water aerosol into a helical path to simulate a tornado prior to the moisture stream exiting the humidifier. The resulting effect is both visually entertaining and practical in terms of humidifying the surrounding room.

Accordingly, it would be desirable to improve upon the entertaining effect of such humidifiers, while providing a simpler and more cost-effective design. It would be further desirable to provide a device which performs a similar effect, but directs airflow in a more predictable and specific pattern.

SUMMARY OF THE INVENTION

The present invention is a humidifier which creates a visually entertaining helical flow of mist. The humidifier generally includes a base unit defining a reservoir for holding a quantity of water, a water tank supported on the base unit for supplying water to the reservoir, a humidification device, such as an ultrasonic transducer, in communication with the reservoir for vaporizing the water held in the reservoir to produce a mist, a vortex unit supported on the base unit and a nozzle and a vortex creator positioned in the vortex unit. The vortex unit has an opening disposed above the base unit reservoir to permit the mist produced by the humidification device to rise upwardly into the vortex unit. The nozzle is positioned adjacent the mist opening for introducing a carrier medium flow into the vortex unit and the vortex creator is positioned above the nozzle and the mist opening for diverting the upwardly rising mist from the reservoir into the carrier medium flow from the nozzle and directing a combined mist and carrier medium flow into a helical path within the vortex unit.

In a preferred embodiment, the vortex creator includes a plate member disposed generally perpendicular to an axis of the vortex unit mist opening and the nozzle has an outlet oriented to direct the carrier medium flow to impinge on the plate member. The nozzle outlet is preferably angularly oriented to direct the carrier medium flow to impinge on the vortex creator plate member at an angle of between about 0 degrees and 90 degrees, and more preferably at an angle of about 45 degrees.

The base unit preferably includes a tray portion defining the reservoir and the nozzle is integrally formed with the tray portion and includes an internal conduit for delivering the carrier medium from below the tray portion into the vortex unit. The vortex unit preferably defines a cylindrical inner chamber for containing the helical flow and includes a transparent or translucent window portion for viewing the helical flow. The vortex unit may further include a removable door for accessing the interior of the said vortex unit. A light emitting element for illuminating the helical flow within the vortex unit and a fan for forcing the carrier medium through the nozzle may also be provided.

The present invention further involves a method for generating a visually entertaining helical flow of mist within a humidifier. The method generally includes the steps of vaporizing an amount of water contained within a reservoir of the humidifier to produce a mist, permitting the mist to rise upwardly from the reservoir into a vortex unit, introducing a flow of carrier medium into the vortex unit adjacent the upwardly rising mist, deflecting the upwardly rising mist into a path of the carrier medium flow with a plate member and directing a combined flow of mist and carrier medium into a helical path within the vortex unit with the plate member. The method preferably includes the step of directing the carrier medium flow to impinge upon the plate member at an angle of between about 0 degrees and 90 degrees, and more preferably at an angle of about 45 degrees.

The preferred embodiments of the humidifier of the present invention, as well as other objects, features and advantages of this invention, will be apparent from the following detailed description, which is to be read in conjunction with the accompanying drawings. The scope of the invention will be pointed out in the claims.

DETAILED DESCRIPTION OF THE PREFERRED EMBODIMENTS

Figure 1:
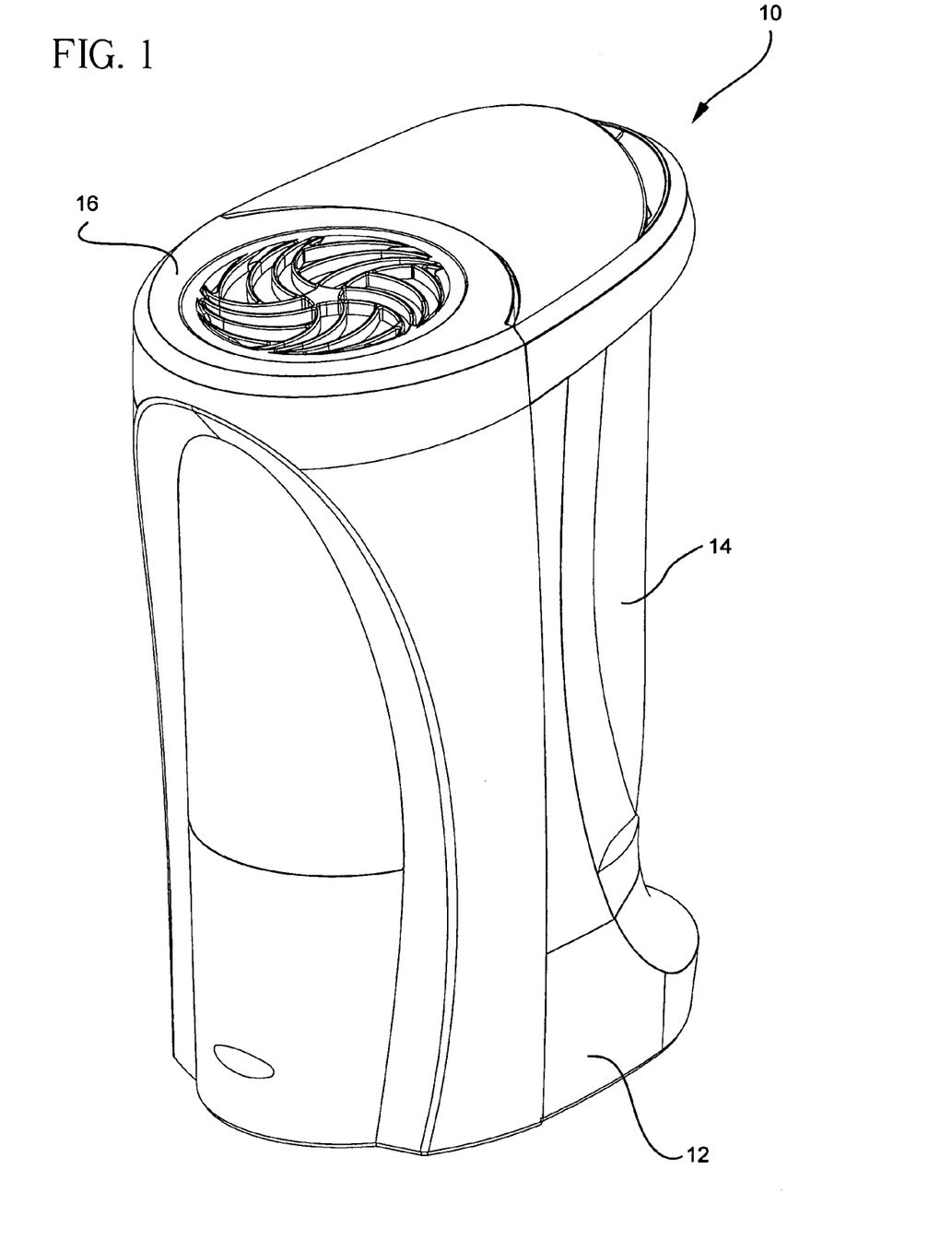
FIG. 1 is a top perspective view of the vortex humidifier formed in accordance with the present invention.
Figure 2:
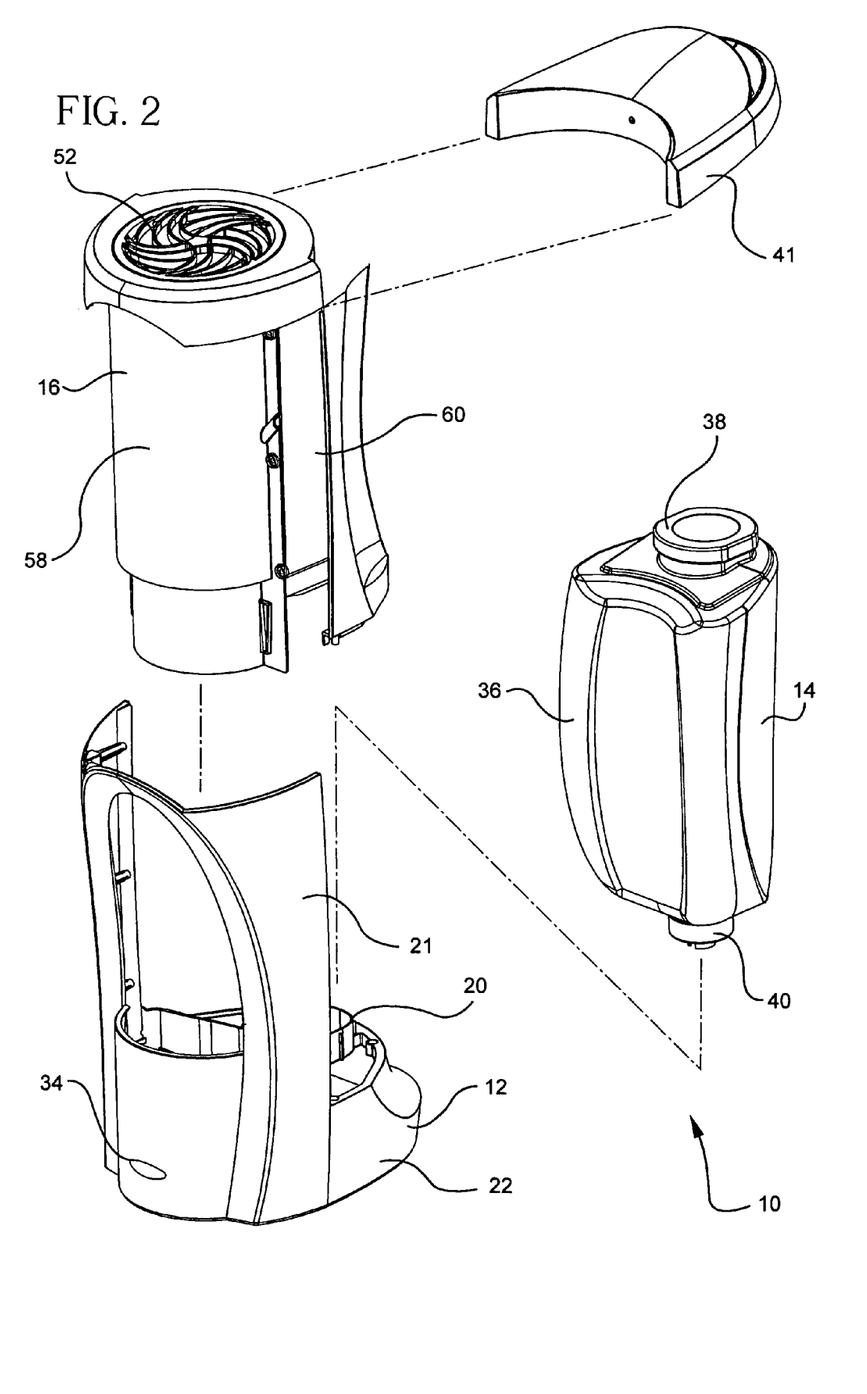
FIG. 2 is an exploded perspective view of the humidifier shown in FIG. 1.

Referring first to FIGS. 1 and 2, a preferred embodiment of the vortex humidifier 10 of the present invention is shown. Humidifier 10 generally includes a base unit 12, a water tank assembly 14 and a vortex unit 16. The base unit 12 is adapted to receive the tank assembly 14, such that the tank assembly is insertable and removable therefrom. The tank assembly 14 provides a storage container for water prior to its vaporization by the humidifier. The vortex unit 16 is normally attached to the base unit 12, but can be removed therefrom for cleaning.

Figure 3:
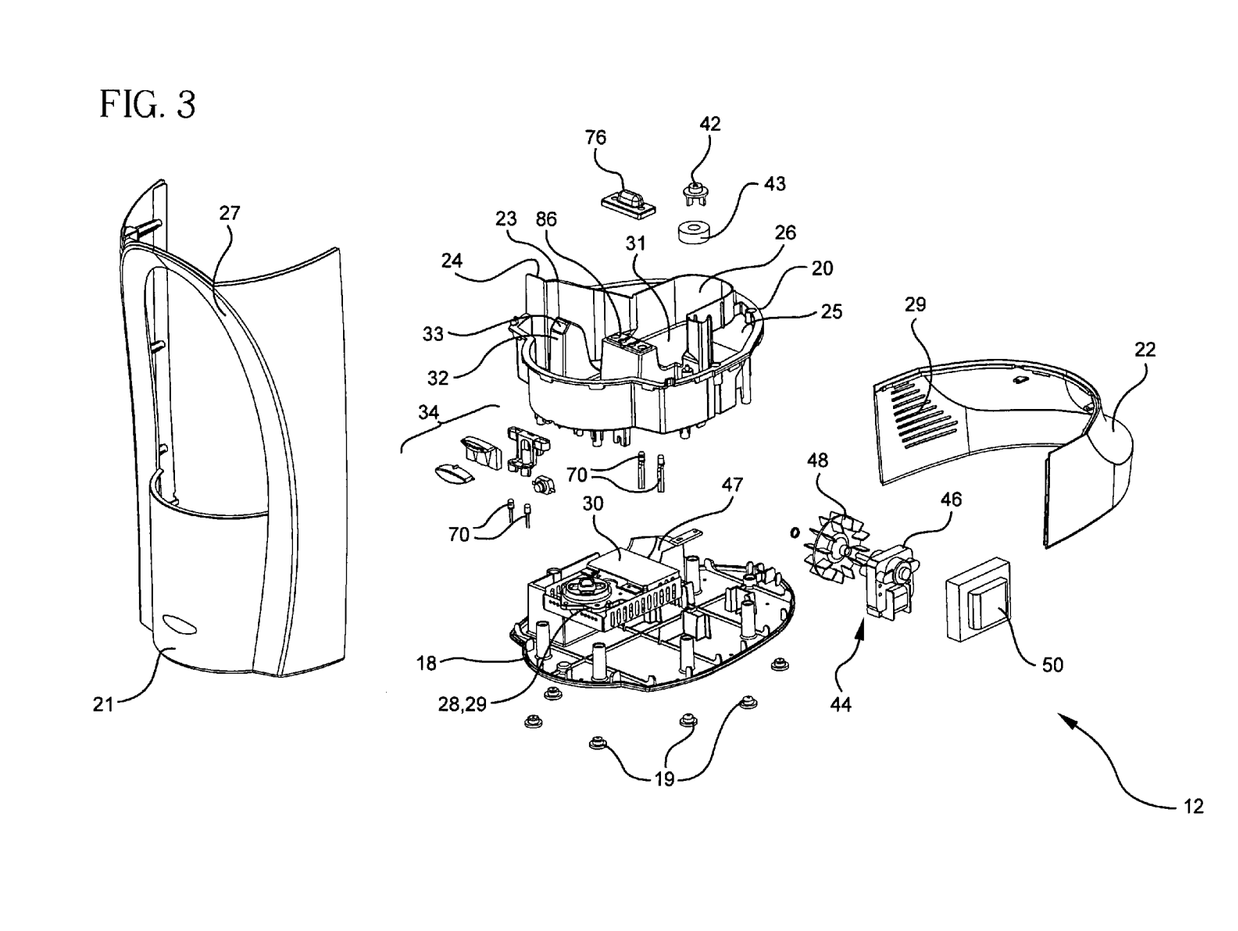
FIG. 3 is a detailed exploded perspective view of the base unit of the humidifier shown in FIG. 1.

Referring additionally to FIG. 3, the base unit 12 includes a bottom portion 18, a tray portion 20, a front cover portion 21 and a rear cover portion 22. The bottom portion 18 is preferably attached to the tray portion 20 with screws or other fasteners (not shown), while the front and rear cover portions 21 and 22 may be snap-fit or otherwise retained between the bottom portion and the tray portion. Rubber feet 19 are preferably located on the bottom of the bottom portion 18 to provide a stable base for the humidifier 10 on a variety of surfaces.

The front and rear cover portions 21 and 22 form a peripheral side wall of the base unit 12. The front cover portion 21 includes a window frame 27 formed therein for viewing the vortex unit 16 and the rear cover portion 22 includes an air inlet 29 formed therein. The base unit 12 may also contain controls 34, accessible through the front cover portion 21, for adjusting the rate of vaporization and the level of ambient humidity desired in a manner well known in the art.

Figure 4:
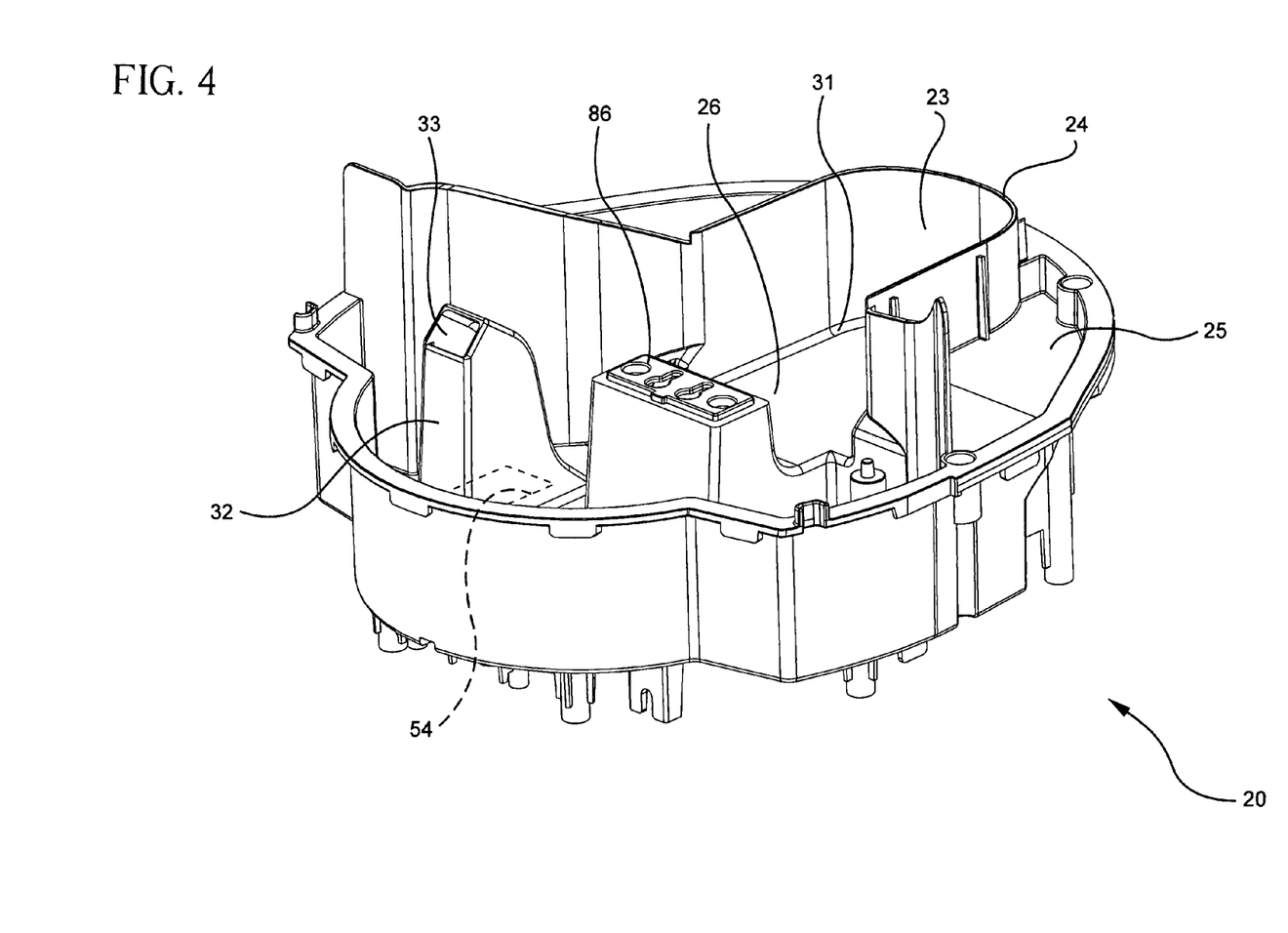
FIG. 4 is an enlarged perspective view of the tray portion of the base unit.

As further shown in FIG. 4, the tray portion 20 includes a wall portion 23 extending upwardly from a floor portion 25 and terminating in a rim 24. The wall portion 23 and the floor portion 25 define a basin like base reservoir 26 that is capable of holding a limited quantity of water. When the tank assembly 14 is inserted into the base 12, water flows from the tank assembly into the reservoir 26 in a manner that will be described in detail below.

The tray portion 20 of the base unit 12 further includes a nozzle 32, which may be formed integral with the tray or formed separately and attached to the tray in a conventional manner. The nozzle 32 is disposed over an opening 54 formed in the floor 25 of the tray portion 20 and includes an outlet 33 formed opposite the tray opening. The outlet 33 is preferably formed at an angle with respect to the floor 25 of the tray portion 20. As will be discussed in further detail below, the nozzle 32 of the base unit 20 extends through a nozzle opening 56 of the vortex unit 16 to deliver a carrier medium, such as ambient air, into the vortex unit.

The water in the base reservoir 26 communicates with a humidification device 28, which is located within the base unit 12. In a preferred embodiment, the humidification device 28 is an ultrasonic transducer 29 attached to the base unit 12 between the bottom portion 18 and the tray portion 20. The ultrasonic transducer 29 includes a vibrating plate 30, which extends through an opening 31 formed in the floor 25 of the tray portion 20 to be in contact with the water contained in the tray portion reservoir 26. The ultrasonically vibrating plate 30 vaporizes the water within the reservoir 26 to produce a vapor or mist, which rises into the vortex unit 16 in a manner described in more detail below.

In alternative embodiments, the humidification device 28 can be of any type well known in the art, such as a heating coil, an inductive element, or an evaporative wick, which causes the evaporating, nebulizing, heating or misting of the water. In addition, throughout this specification the terms vaporize and vaporization are used to refer to the process of transforming water to a gas-like state such as a vapor, a mist or a fine spray so that it way be dispersed to the surrounding air and increase the water content thereof.

A fan assembly 44 is also provided within the base unit 12 for creating an airflow within the humidifier. The fan assembly 44 includes a motor 46, a propeller 48 and a transformer 50. The motor 46 is preferably an electric motor which is mounted to the base unit 12 between the bottom portion 18 and the tray portion 20. The propeller 48 is rotatably received in a cowl portion 47 of the base bottom portion 18 and initially draws relatively dry air in through the air inlet 29 of the base unit rear cover portion 22. Air drawn into the base unit 12 by the fan assembly 44 is forced upwardly through the opening 54 of the tray portion 20 and out through the angularly oriented outlet 33 of the nozzle 32. As will be discussed in further detail below, the airflow passing through the tray portion 20 is mixed with the water vapor generated in the reservoir 26 before exiting through a vortex chamber outlet 52 provided at an upper end of the vortex unit 16.

Figure 5:
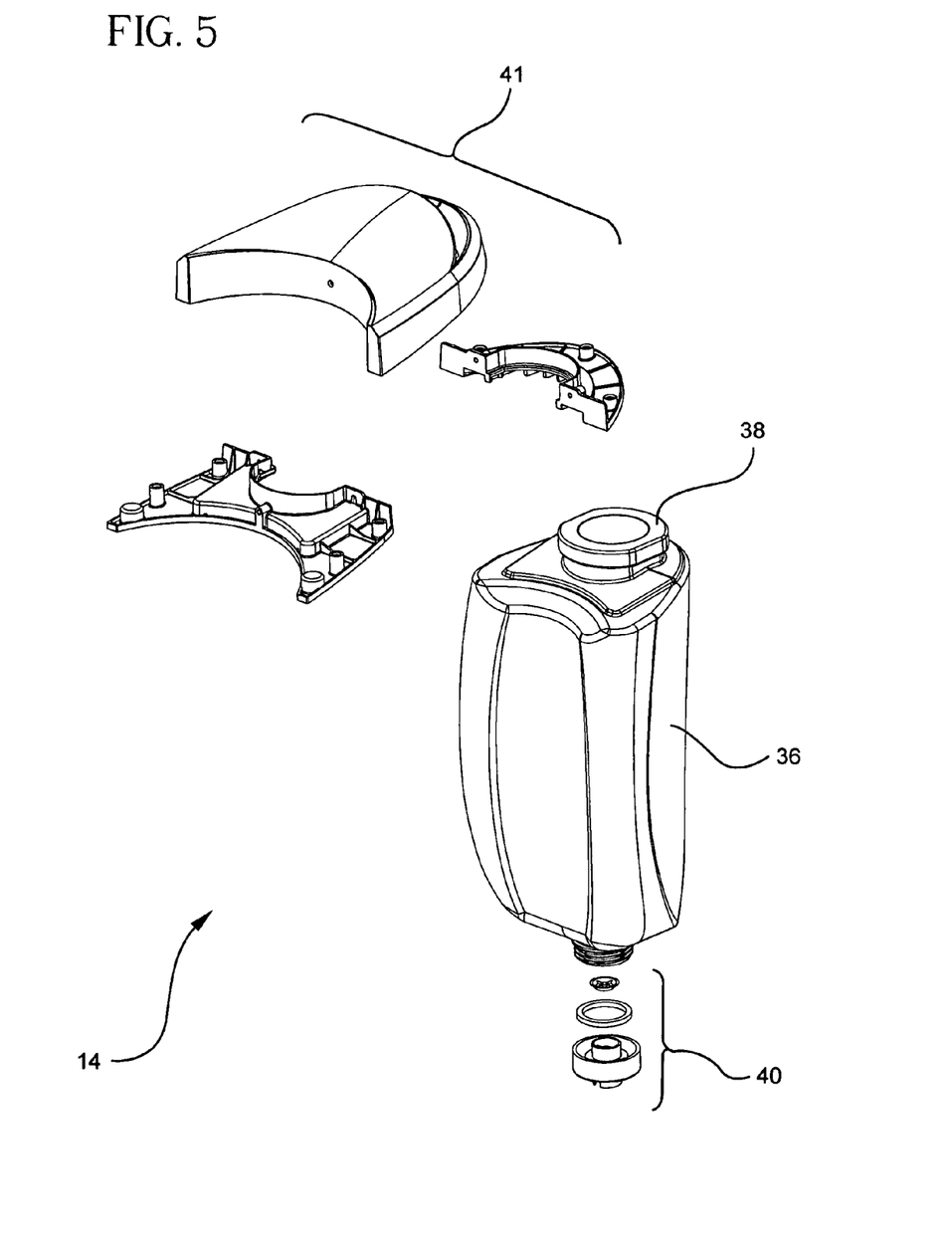
FIG. 5 is a detailed exploded perspective view of the water tank assembly of the humidifier shown in FIG. 1.

Referring now to FIG. 5, the water tank assembly 14 includes a tank 36, a tank cap 38 positioned over an opening formed at the top of the tank and a valve assembly 40 mounted at an opening formed in the bottom of the tank. The opening at the top of the tank 36 serves as a filling port and the opening at the bottom of the tank serves as a water exiting port. The water tank assembly 14 can also include a handle 41 to facilitate removal and refilling of the tank 36.

The valve assembly 40 is of a type well known in the art which prevents water from flowing from the tank 36 when it is outside the base unit 12, but allows water to exit the tank when the tank is inserted in the base. In this regard, the valve assembly 40 is engageable with a valve actuator 42, provided in the base unit 12, for permitting water to exit the tank 36 to flow into the base reservoir 26. As shown in FIG. 3, the valve actuator 42 is preferably a protrusion or button-type member provided in the tray portion 20 of the base unit 12 and extending upwardly from the bottom of the reservoir 26. The valve actuator 42 is positioned within the reservoir 26 such that it aligns with the valve assembly 40 when the tank unit 14 is seated within the base unit 12. Additionally, a float 43 may be provided with the valve actuator 42 for the purpose of closing the valve assembly 40 of the tank unit 14.

Figure 6:
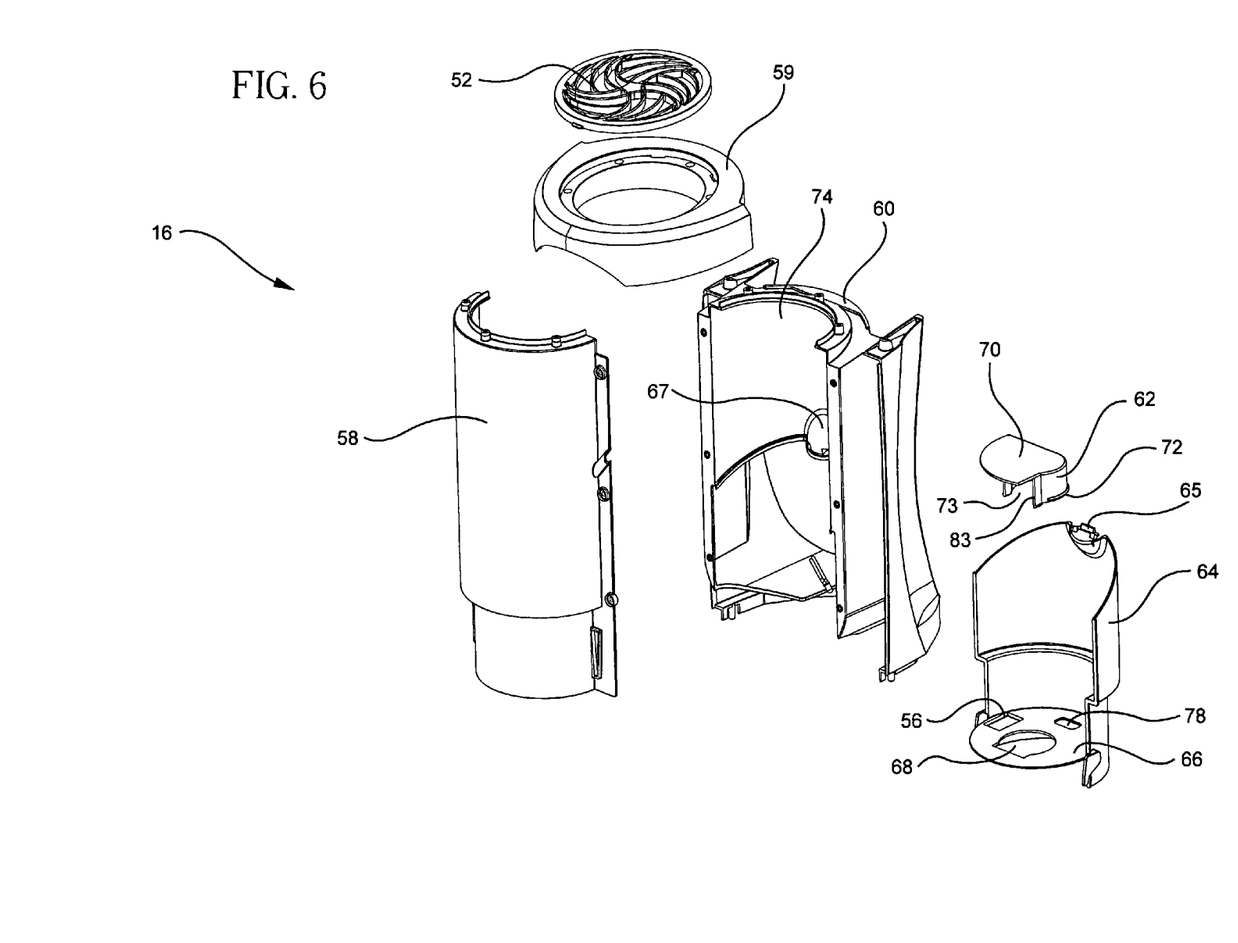
FIG. 6 is a detailed exploded perspective view vortex unit of the humidifier shown in FIG. 1.
Figure 7:
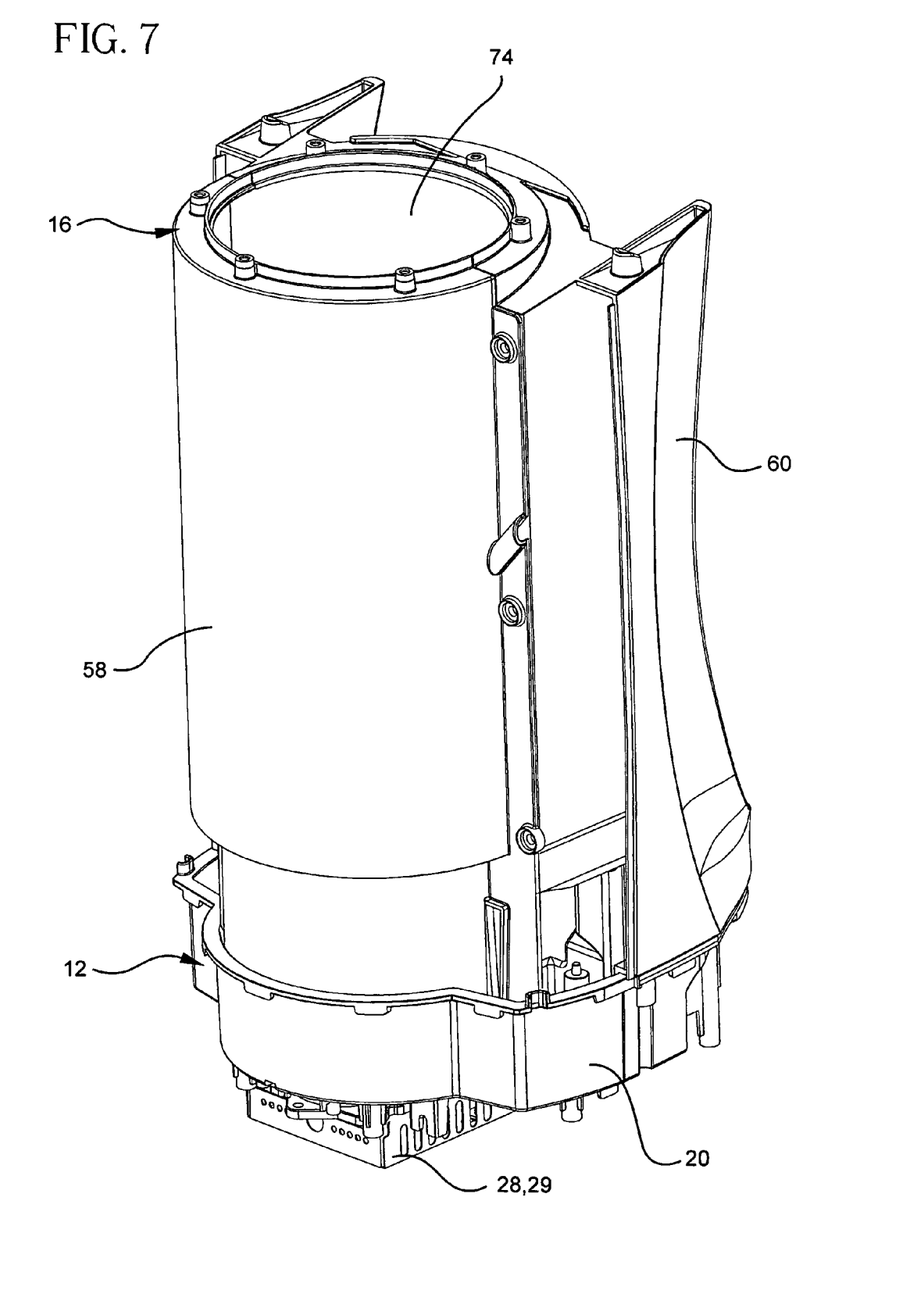
FIG. 7 is a perspective view of the vortex unit mounted to the tray portion of the base unit.

Referring now to FIGS. 6 and 7, the vortex unit 16 preferably includes a transparent or translucent vortex window 58, a rear housing 60 and a vortex creator 62. The vortex window 58 is in the form of a half-cylinder with the rear housing 60 forming the other half. When fitted together, the vortex window 58 and the rear housing 60 define a cylindrical vortex chamber or chimney 74. Preferably attached to the window 58 and rear housing 60, and closing off the top of the chamber 74, is a chamber cover 59 including the vortex chamber outlet 52. The vortex chamber outlet 52 is preferably in the form of a removable grill element.

In a preferred embodiment, the vortex unit 16 further includes a vortex clean door 64 having a floor portion 66. However, it is conceivable for the floor portion 66 of the vortex clean door 64 to be integrated with the rear housing 60. In the preferred embodiment, the vortex clean door 64 is removably attached to the vortex rear housing 60 via a simple latch mechanism 65, which engages the rim of a finger opening 67 formed in the rear housing. Such removal of the clean door 64 provides access to the interior surface of the vortex window 58 for cleaning.

The floor portion 66 of the vortex clean door 64 is formed with the nozzle opening 56 mentioned above and is also formed with a mist or vapor opening 68. The mist or vapor opening 68 communicates with the tray reservoir 26 when the vortex unit 16 is mounted to the base unit 12. In this manner, vapor or mist generated by the humidification device 28 rises from the base reservoir 26 through the vapor opening 68 formed in the floor portion 66 and enters the vapor unit 16. As mentioned above, the vapor entering the vortex unit 16 through the vapor opening 68 mixes with the air entering the vortex unit through the nozzle 32.

The vortex creator 62 is attached to the floor portion 66 of the clean door 64 and is positioned over both the nozzle 32 and the vapor opening 68. The vortex creator 62 includes an upper plate-like member 70 and a side wall 72 extending downwardly from the plate-like member for attachment to the floor portion 66 of the clean door 64.

Figure 8:
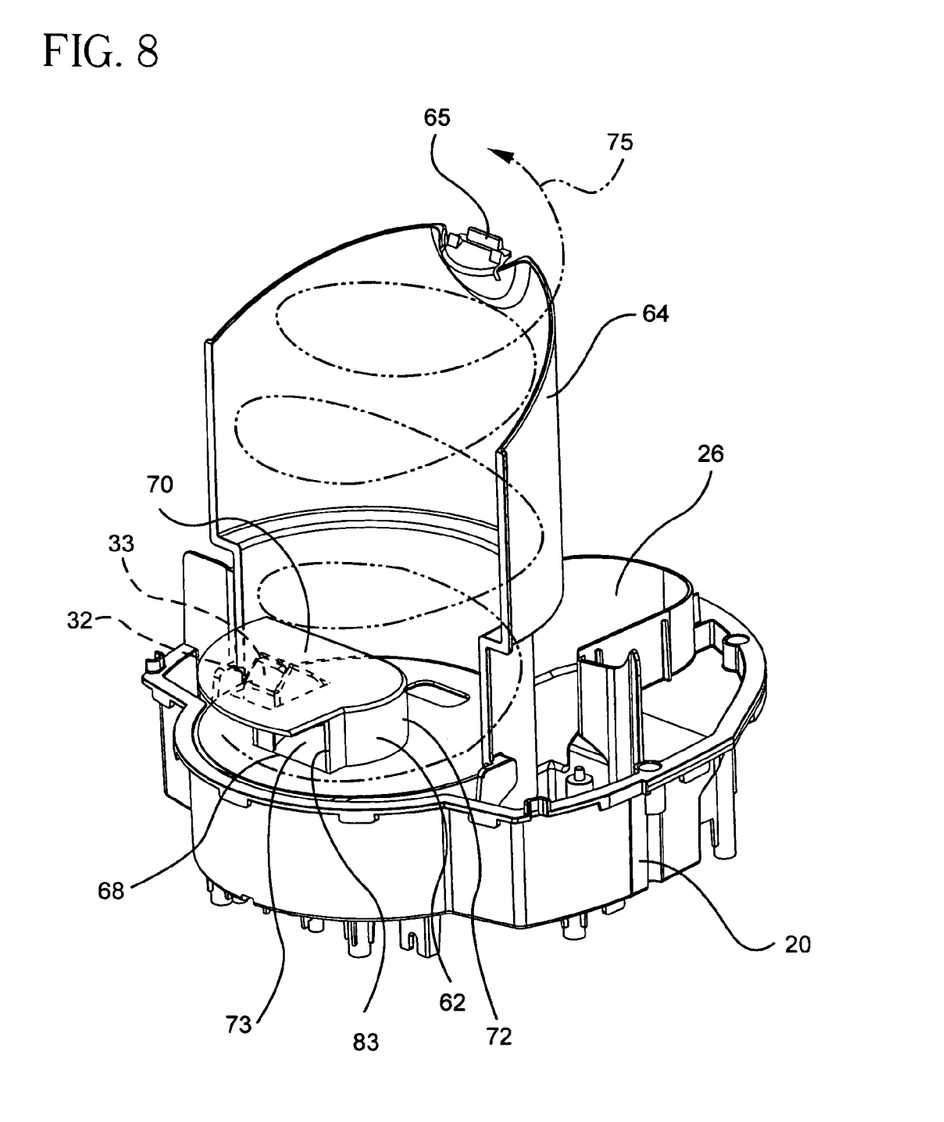
FIG. 8 is an enlarged perspective view of the vortex creator and base unit tray portion with the vortex window and rear housing removed for clarity.
Figure 9:
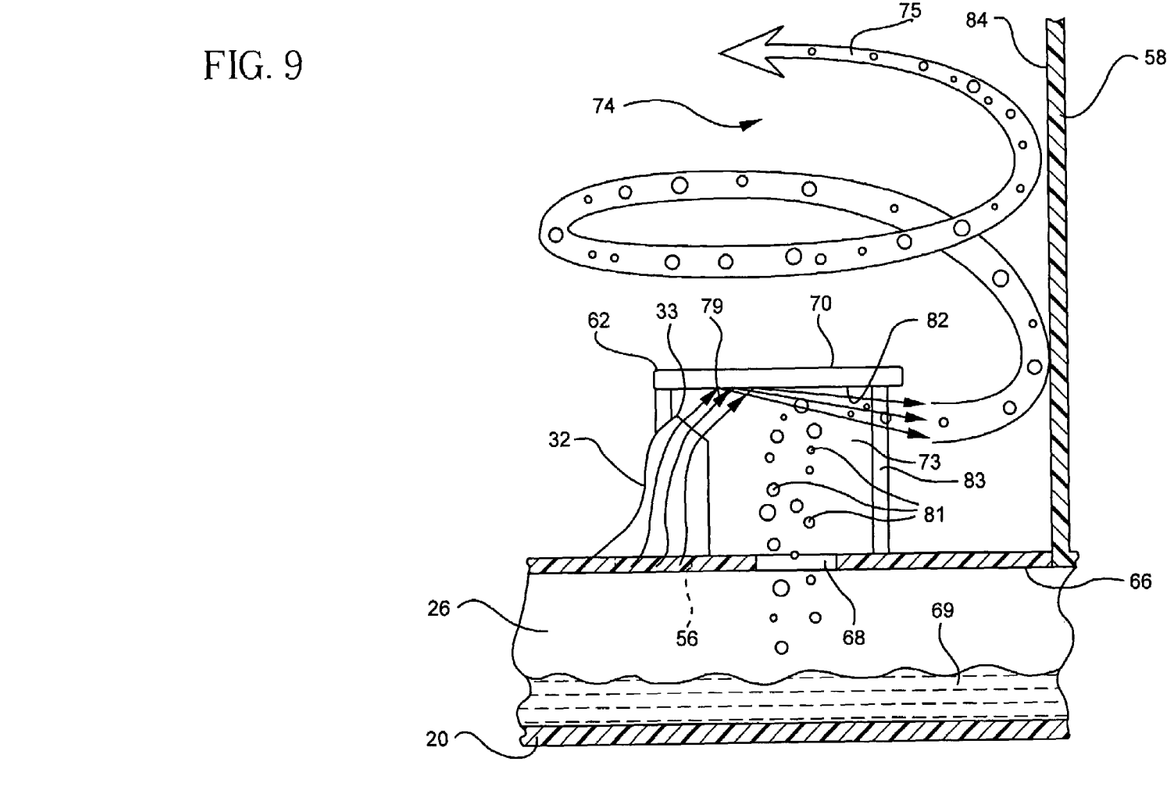
FIG. 9 is a side view of the vortex creator and tray portion nozzle.

As shown in FIGS. 8 and 9, when the vortex creator 62 is attached to the floor portion 66, the upper plate-like member 70 and the side wall 72 define a mist mixing chamber 73 disposed over the mist opening 68. In particular, the mist 81 generated from the water 69 contained in the tray reservoir 26 rises through the mist opening 68 and mixes with air 79 exiting the outlet 33 of the nozzle 32. Moreover, the vortex creator 62 acts like a baffle or diverter for both the air 79 exiting the nozzle outlet 33 and the mist or vapor 81 exiting the vapor opening 68. Specifically, the base nozzle 32 directs air at an angle to impinge upon the bottom surface 82 of the plate-like member 70 of the vortex creator 62 and upon the inside surface 84 of the vortex window 58, where the air is redirected in a horizontal direction. Thus, the outlet 33 of the nozzle is angularly oriented at an angle of between 0 and 90 degrees, and is preferably about 45 degrees.

The upper plate-like member 70 and the side wall 72 of the vortex creator 62, together with the inner surface 84 of the vortex window 58 further define a mist flow outlet 83 for directing the combined air/mist flow into the vortex chamber 74 in a helical path. Specifically, the air 79 is first mixed with the vapor 81 rising from the base reservoir 26 through the vapor opening 68 in the vortex creator mixing chamber 73. The vortex creator 62 diverts the combined air/mist horizontally through the mist flow outlet 83 into the vortex chamber 74 defined between the vortex window 58, the vortex rear housing 60 and the clean door 64. The horizontal air flow caused by the vortex creator 62 combined with the vertical inner surface 84 of the vortex window 58, as well as the natural tendency for the water mist to rise, creates a helical flow path for the air/water vapor mixture within the vortex chamber 74, as shown by arrow 75 in FIGS. 8 and 9. Such helical flow presents an entertaining visual element to the vapor mixture in the form of a vortex simulating a tornado or a whirlpool.

The vortex is visible through the transparent vortex window 58 before it exits the vortex chamber 74 through the chamber outlet 52. To further enhance the vortex visual effect, the humidifier of the present invention can further be provided with illuminating features. In particular, the base unit 12 can further contain one or more light emitting elements 70, such as light emitting diodes (LEDs), as shown in FIG. 3, which project light into the vortex chamber 74 to illuminate the vortex. Furthermore, a lens 76 can be fitted within an opening 86 formed in the floor 25 of the tray portion 20 and an opening 78 formed in the floor 66 of the clean door 64 to permit the light emitted by the light elements 70 to pass through the tray and door into the vortex chamber 74.

As a result of the present invention, a humidifier is provided which creates a visually entertaining helical flow of mist, while at the same time, functions to raise the humidity level within a room or office. The visual effect is achieved with a simple and cost-effective design and an airflow is created having a more predictable and specific pattern.

Although illustrative embodiments of the present invention have been described herein with reference to the accompanying drawings, it is to be understood that the invention is not limited to those precise embodiments, and that various other changes and modifications may be effected by one skilled in the art without departing from the scope or spirit of the invention.

What is claimed is:

1. A humidifier comprising:
    a base unit defining a reservoir for holding a quantity of water;
    a water tank supported on said base unit for supplying water to said reservoir;
    a humidification device in communication with said reservoir for vaporizing the water held in said reservoir to produce a mist;
    a vortex unit supported on said base unit, said vortex unit having an opening disposed above said base unit reservoir to permit the mist produced by said humidification device to rise upwardly into said vortex unit;
    a nozzle disposed in said vortex unit adjacent said mist opening for introducing a carrier medium flow into said vortex unit; and
    a vortex creator positioned in said vortex unit above said nozzle and said mist opening for diverting the upwardly rising mist from said reservoir into the carrier medium flow from said nozzle and directing a combined mist and carrier medium flow into a helical path within said vortex unit.

2. A humidifier as defined in claim 1, wherein said vortex creator comprises a plate member disposed generally perpendicular to an axis of said vortex unit mist opening.

3. A humidifier as defined in claim 2, wherein said vortex creator further comprises a side wall extending downwardly from said plate member, said plate member and said side wall defining a mist mixing chamber disposed over said mist opening.

4. A humidifier as defined in claim 2, wherein said nozzle has an outlet oriented to direct said carrier medium flow to impinge on said vortex creator plate member.

5. A humidifier as defined in claim 4, wherein said nozzle outlet is angularly oriented to direct said carrier medium flow to impinge on said vortex creator plate member at an angle of between about 0 degrees and 90 degrees.

6. A humidifier as defined in claim 5, wherein said nozzle outlet is angularly oriented to direct said carrier medium flow to impinge on said vortex creator plate member at an angle of about 45 degrees.

7. A humidifier as defined in claim 1, wherein said vortex unit defines a cylindrical inner chamber for containing the helical flow.

8. A humidifier as defined in claim 1, wherein said vortex unit includes a transparent or translucent window portion for viewing the helical flow.

9. A humidifier as defined in claim 1, further comprising a light emitting element for illuminating the helical flow within said vortex unit.

10. A humidifier as defined in claim 1, wherein said vortex unit includes a removable door for accessing the interior of said vortex unit.

11. A humidifier as defined in claim 1, wherein said humidification device is an ultrasonic transducer.

12. A humidifier as defined in claim 1, further comprising a fan for forcing said carrier medium through said nozzle.

13. A humidifier as defined in claim 1, wherein base unit includes a tray portion defining said reservoir and said nozzle is integrally formed with said tray portion and includes an internal conduit for delivering the carrier medium from below said tray portion into said vortex unit.

14. A method for generating a visually entertaining helical flow of mist within a humidifier comprising the steps of:

vaporizing an amount of water contained within a reservoir of the humidifier to produce a mist;

permitting said mist to rise upwardly from said reservoir into a vortex unit;

introducing a flow of carrier medium into said vortex unit adjacent said upwardly rising mist;

deflecting said upwardly rising mist into a path of said carrier medium flow with a plate member; and directing a combined flow of mist and carrier medium into a helical path within said vortex unit with said plate member.

15. A method as defined in claim 14, further comprising the step of directing said carrier medium flow to impinge upon said plate member.

16. A method as defined in claim 15, wherein said carrier medium flow impinges on said plate member at an angle of between about 0 degrees and 90 degrees.

17. A method as defined in claim 16, wherein said angle is about 45 degrees.

18. A method as defined in claim 14, further comprising the step of illuminating said helical path within said vortex unit.

* * * * *